2,914,396
PROCESS FOR TREATING ORE

Albert R. Stargardter, Washington, Pa., assignor to Washington Steel Corporation, Washington, Pa., a corporation of Pennsylvania No Drawing. Application February 17, 1959
Serial No. 793,690

7 Claims. (Cl. 75—13)

It has been found that the current practice of repeatedly remelting stainless steel scrap has resulted in a build-up to a dangerously high percentage of deleterious tramp alloys, including phosphorous, which are not removed in current electric furnace melting and refining practice.

This invention discloses an improved method for supplying the electric melting and refining furnaces with freshly smelted melting stock in place of the polluted stainless steel scrap currently being used. In addition, the method offers additional quantities of scarce and highly strategic nickel which, by this process, is obtained from existing iron and nickel-bearing serpentine ores efficiently and economically.

The serpentine ores which are profitably used in the present process are presently not being utilized in current, known ore-treating procedures due to the low iron content of these ores. Those refiners using chemical processes for nickel recovery are "stock-piling" the serpentines due to their low iron content and are using only the laterites which contain from 35% to 52% iron. The serpentine ores suitable for this process usually contain only from about 15% to 30% iron and are considered unsuitable for currently used pyro-metallurgical processing. Thus, I have provided a method for processing unwanted and unused nickel-bearing serpentine ores directly into chrome-nickel stainless steel.

The process of this invention involves a combination of steps whereby it is possible to take a iron-bearing ore having an appreciable amount of nickel and treat in such a manner that for the manufacture of stainless steel, no additional iron or nickel (the latter being extremely scarce) need be supplied, and only chromium, which may be added in the form of the relatively inexpensive ferro-chrome, is necessary to be included in order to produce any desired type of chrome-nickel stainless steel. Moreover, by following the procedures set out below, the carbon content of the metal from the ore is reduced to such an extent that it is at the optimum low level for producing the stainless steel melt in an electric furnace. These are advantages of the highest significance, not only economically, but also were surprising, as will be appreciated from the following disclosure.

In brief, I have provided a process for producing chrome-nickel stainless steel devoid of "tramp metals" and undesirable constituents, which heretofore have been present where stainless steel is produced from remelted stainless steel scrap.

The equipment used for the experimental smelting consisted of a rotary kiln 5 feet in diameter by 9 feet long. A lining of 70% alumina brick proved to be satisfactory since a total of 120 heats were produced on a single lining.

Finally, each heat consisted of a charge of 1,500 pounds of serpentine ore along with suitable additions of lime or of sand, as required to produce a slag with a base to silica ratio of 1.10:1.20, on the basis $$\frac{CaO + MgO + Al_2O_3 + FeO}{SiO_2} = 1.10 \text{ to } 1.20$$

Where the amount of the batch was increased or decreased, substantially similar proportions, i.e., ratios, were maintained.

The serpentine ores successfully processed by this invention contained about 30 to 15% iron, and 1 to 2% nickel.

Typical ores analysed as follows:

| Percent Fe | Percent Ni | Percent MgO | Percent Al₂O₃ | Percent SiO₂ |
|---|---|---|---|---|
| 30 | 1.62 | 16 | 2.00 | 23 |
| 15 | 1.58 | 24 | 1.70 | 33 |

EXAMPLE 1

Step I

Cuban serpentine ore having an appreciable nickel content of about 1.5% and iron content of about 21% is mixed with sufficient coke and smelted in a conventional gas or oil-fired rotary kiln. This smelting effects complete reduction of all iron and nickel in the ore, including an inconsequential amount of cobalt usually present in the ore. The contents of the kiln are finally brought to a temperature of about 2550° F. at which temperature both metal and slag are fluid.

A temperature of from 2450° F. to 2650° F. has been used in lieu of that recited, the important feature being that all the nickel and iron in the ore is reduced and the metal and slag are rendered fluid.

Any other iron-bearing ore, preferably with an appreciable nickel content, may be used. Coke fines or breeze, as well as anthracite fines, have been successfully substituted for the coke.

Step II

The molten slag is discarded after the molten metal is transferred to a basic-lined Bessemer converter, preferably top blown and air is blown into the metal. This procedure removes all of the carbon, all but a negligible amount of the phosphorous, as well as a majority of the sulfur. The original ore which contained 21% iron and 1.5% nickel provides a molten metal entering the converter which analyzes approximately 93% iron and 6% nickel (with traces of the other residual elements), representing about 90% of the nickel available in the original ore. The converter blowing is continued until about one-half of the iron is oxidized to iron oxide which enters the slag. The metal remaining will contain about 12% nickel and about 87% iron, will be practically carbon free, low in phosphorous, and with a diminished sulfur content.

Step III

The molten metal from the converter is then transferred to a conventional basic-lined electric melting furnace. An addition of low carbon ferro-chromium containing about 70% chromium is made to the molten bath in an amount to provide the necessary chromium alloy in the desired grade of stainless steel. If A.I.S.I. type 304 is the desired end product, the metal transferred from the converter will contain sufficient nickel to tolerate a ferro-chromium addition adequate in amount to provide the necessary 18% to 20% chromium content in the finished steel. That is, 10 tons of the molten metal containing 12% nickel from Step II is transferred to the electric furnace. An addition of 7,500 pounds of 70% low carbon ferro-chromium will produce about 27,500 pounds of A.I.S.I. type 304 stainless steel with a nominal analysis of .06% carbon, 8.6% nickel, 19.0% chromium, along with the usual small amounts of silicon and manganese which would be added to the bath.

As will be observed, a valuable advantage is obtained through the use of the three-step method by elimination of the expensive removal of carbon with use of the oxygen lance. Complete carbon removal is obtained during the converter blowing described in Step II above. Also, scarce and strategically important nickel at low cost is obtained and, moreover, there results production of cleaner steel of higher quality than is now obtainable.

Step I and Step II described above can most advantageously be accomplished at the ore mine site as, for example, in Cuba, where low priced Cuban labor can be beneficially obtained. Processing at the mine site of these first two steps also reduces shipping costs, since 12% nickel alloy from the converter could be pigged and shipped to a United States port for remelting and final refining in an electric melting furnace installation in this country, at a great savings in transoceanic freight costs and handling. For example, the freight rate for handling and shipping ore containing 1.5% nickel to a United States port from Cuba is about $13.00 per gross ton or about 40 cents per pound of contained nickel. After the ore has been processed in Step I, followed by Step II at the mine site in Cuba, the carbon-free 12% nickel alloy can be pigged and shipped in pig form to the United States for remelting and finishing as per Step III in an electric melting furnace. A gross ton of the 1.5% nickel Cuban ore would yield about 224 pounds of 12% nickel alloy (the efficiency of nickel recovery from the ore being about 80%). Thus, the nickel obtained from one gross ton of serpentine ore will bear a shipping cost from Cuba of only $1.30 or 4.8 cents per pound of contained nickel. When consideration is given to the costs of exporting into Cuba the requisite amount of coke and fuel oil for the kiln operation, the net savings in shipping and handling costs by processing at the mine site amounts to about 20 cents per pound of nickel contained in the ore.

EXAMPLE 1a

A modified form of the invention is accomplished through use of an acid-lined Bessemer-type converter as follows:

Molten metal containing a nominal 3.00% carbon, 6% nickel, approximately .04% phosphorous, .22% sulfur, balance substantially iron, can be poured into a ladle containing the requisite amount of caustic soda, i.e., about 20 pounds of caustic per ton of metal. This is reladled into a second ladle to secure proper, i.e. complete, mixing at which time substantially all of the sulfur is removed by the caustic soda treatment, the phosphorous remaining substantially intact in the metal. The molten metal thus desulfurized is transferred to an acid-lined Bessemer converter and the iron and carbon removal by blowing proceeds as described above. Complete phosphorous removal is obtained by existing methods in the electric furnace. The phosphorous-bearing slag is then removed from the melt, the metal then deoxidized in the conventional way, followed by the ferro-chromium addition described above to obtain the same end result. However, the basic-lined Bessemer converter is considered preferable for carrying out the invention as described above.

EXAMPLE 2

For the reduction of each 1,500 pound batch of serpentine ore, 300 pounds of either coke breeze or anthracite fines were added to the mix and charged into the kiln which was fired by a single burner with natural gas and preheated air. At the end of about 4 hours' heating, reduction was completed, both metal and slag being fluid at about 2550° F.

The kiln was then stopped, the metal tapped into 50 pound pigs and the slag tapped into slag pots.

The average composition of the serpentine ore smelted was:

| | Percent |
|---|---|
| Iron | 21.5 |
| Silica | 28.5 |
| Alumina | 5.5 |
| Lime | .7 |
| Magnesia | 19.3 |
| Chromium | .9 |
| Nickel | 1.23 |
| Cobalt | .07 |

The pig iron obtained analyzed:

| | Percent |
|---|---|
| Carbon | 2.85 |
| Phosphorous | .035 |
| Sulfur | .22 |
| Silicon | .05 |
| Chromium | .35 |
| Manganese | Trace |
| Cobalt | .28 |
| Nickel | 6.00 |
| Iron | Balance |

Aside from about 17% dust losses which, in the absence of a suitable dust collector was to be expected, nickel recovery averaged 90% and iron recovery about 85%. About 11,000 pounds of the 6% nickel ferro-nickel pigs were remelted in a 4-ton basic open hearth furnace and duplexed into a 1-ton basic lined, side-blown converter. Each charge was blown until it was estimated that about one-half of the iron was oxidized from the melt.

In other runs, the pig iron analyzed within the following range:

| | Percent |
|---|---|
| Carbon | 2.6 to 3.6 |
| Phosphorous | .03 to .05 |
| Sulfur | .20 to .25 |
| Silicon | .05 |
| Chromium | .25 to .40 |
| Manganese | Trace |
| Cobalt | .25 to .30 |
| Nickel | 5.8 to 6.2 |
| Iron | Balance |

A total of 3,560 pounds of the higher nickel alloy was obtained from the foregoing converter operation in the form of 50 pound pigs. In order to secure an accurate analysis of the product, the entire lot was remelted in the open hearth in a single heat and cast into pigs.

This metal analyzed:

| | Percent |
|---|---|
| Carbon | .005 |
| Phosphorous | .019 |
| Sulfur | .028 |
| Silicon | .04 |
| Chromium | Nil |
| Manganese | Nil |
| Nickel | 16.6 |
| Cobalt | .81 |
| Iron | Balance |

In the upgrading operation 10% of the nickel in the alloy was lost in the slag so that the total final recovery of nickel from the ore was 80%.

During the converter upgrading undue lining erosion by molten iron oxide was prevented by the introduction of small amounts of finely powdered magnesia, e.g. 6 to 10 pounds per ton, preferably 7 pounds per ton, into the air stream to prevent excessively high metal temperatures. It is believed that this measure was instrumental in obtaining the final low sulfur content which it will be noted was reduced from .20 to .25 down to .028%. The 16.6% nickel ferro-nickel thus obtained is melted into a heat of 18-8 stainless steel and the product obtained was carefully evaluated and stainless steel of exceptionally good quality was obtained.

EXAMPLE 3

With a 40,000 pound charge of dry ore similar to that of Example 2, except it analyzed 1.5% nickel instead of the 1.23% already noted in Example 2 above, is mixed 8,000 pounds of anthracite fines, and the necessary lime added to the mix to form the ratio already given above. The mix is heated in a gas-fired rotary kiln to 2550° F. At this stage the smelted metal will be thoroughly liquid, as well as the slag. The metal at this time has the following analysis:

| | Percent |
|---|---|
| Carbon | 2.85 |
| Phosphorous | .035 |
| Sulfur | .22 |
| Silicon | .05 |
| Chromium | .35 |
| Manganese | Trace |
| Cobalt | .28 |
| Nickel | 6.00 |
| Iron | Balance |

In other runs, the metal analyzed within the following range:

| | Percent |
|---|---|
| Carbon | 2.6 to 3.0 |
| Phosphorous | .03 to .05 |
| Sulfur | .20 to .25 |
| Silicon | .05 |
| Chromium | .25 to .40 |
| Manganese | Trace |
| Cobalt | .25 to .30 |
| Nickel | 5.8 to 6.2 |
| Iron | Balance |

This hot metal is transferred to a basic Bessemer converter and is blown until about one-half of the iron is oxidized from the melt. At this stage the metal charge will consist of about 4,500 pounds of 12% nickel-iron having the analysis already given in Example 2, except the nickel analyzed 12% instead of 16.6%. The molten metal from the Bessemer converter is tapped into a ladle and poured into an electric melting furnace. The metal is deoxidized by conventional deoxidation practice. An addition of about 1,800 pounds of 70% chromium low-carbon ferro-chrome is added. After addition of the necessary manganese and silicon, about 6,300 pounds of finished stainless steel are tapped from the electric furnace of the following nominal compositions:

| | Percent |
|---|---|
| Carbon | .06 |
| Nickel | 8.5 |
| Sulfur | .025 |
| Phosphorous | .010 |
| Manganese | .90 |
| Silicon | .50 |
| Chromium | 18.5 |

Coke breeze was used instead of anthracite fines in the same amount with some runs.

It will be observed that I have developed a process of producing chrome-nickel stainless steel comprising the steps of (1) smelting an iron-bearing ore with an appreciable nickel content under temperature conditions and for a time until both the metal and the slag are fluid, removing the slag, (2) treating the metal in a Bessemer converter and removing by oxidation substantially all of the carbon, phosphorous and sulfur, and a substantial part of the iron as iron oxide whereby the amount of nickel in the remaining alloy is appreciably upgraded, and (3) thereafter converting the alloy including added ferro-chrome in an electric furnace to a chrome-nickel stainless steel in which the nickel content is substantially entirely that obtained from the original ore and the alloy is free of "tramp" alloys and constituents, characteristic of remelted stainless steel scrap.

The nickel is upgraded to between about 11% and 16% and frequently to about 12%. Low carbon ferro-chrome is added in Step 3, and by "low carbon" in this application is meant any commercial grade, e.g. having a carbon content of less than 0.10%, and a chromium content of about 40% to 70%.

As stated, a basic-lined Bessemer converter is preferred, but an acid-lined Bessemer converter may be satisfactorily used, particularly as disclosed in Example 1a.

In the upgrading in the converter in the foregoing examples small amounts of finely divided magnesia, usually 7 pounds per ton, and within the range of 6 to 10 pounds per ton, are added in the air stream as described above.

From the foregoing, it will be seen that I up-grade the nickel to the range of about 11.% to 16.% nickel in the ferro-nickel obtained in the manner described, so that these extremes may be used as follows to produce nominal 18.% chrome–8% nickel stainless steels:

To produce 1000 lbs. of "18–8" I use:

EXAMPLE (a)

730 lbs. of 11.% nickel, ferro-nickel (prepared from the foregoing examples)
+270 lbs. of 67.% chromium, ferro-chrome
1000 lbs. of "18–8" stainless steel

EXAMPLE (b)

550 lbs. of 16.% nickel, ferro-nickel (prepared from the above examples)
+450 lbs. of 40% chromium, ferro-chrome
1000 lbs. of nominal "18–8" stainless steel I regard the range of about 11.% Ni to 16.% Ni as ferro-nickel produced by this invention is best adapted for final additions of commercially available ferro-chrome. Naturally, ferro-chrome with a chromium content compatible with the nickel content of the ferro-nickel is selected, as may be readily understood from the above examples.

This application is a continuation-in-part of application, Serial No. 669,702, filed July 3, 1957.

I claim:
1. The process of producing chrome-nickel stainless steel comprising the steps of (1) smelting an iron-bearing ore of the serpentine type having about 15 to 30% iron with an appreciable nickel content of about 1 to 2% under temperature conditions and for a time until both the metal and the slag are fluid, removing the slag, (2) treating the metal in a Bessemer converter and removing by oxidation substantially all of the carbon, phosphorous and sulfur, and a substantial part of the iron as iron oxide whereby the amount of nickel in the remaining alloy is appreciably upgraded to about 11 to 16%, and (3) thereafter converting the alloy including added ferro-chrome in an electric furnace to a chrome-nickel stainless steel in which the nickel content is substantially entirely that obtained from the original ore and the alloy is free of "tramp" alloys and constituents characteristic of remelted stainless steel scrap.

2. A process according to claim 1 wherein the amount of nickel is upgraded to about 12%.

3. A process according to claim 1 wherein the low carbon ferro-chrome is added having a chromium content of about 40 to 70% and a carbon content less than about 0.10%.

4. A process according to claim 1 wherein the Bessemer converter is basic lined.

5. The process according to claim 1 wherein the upgrading in the Bessemer converter is carried out in the presence of finely divided magnesia added to the air stream in order to control slag temperature and also to remove sulfur from the metal.

6. The process of producing chrome-nickel stainless steel comprising the steps of (1) smelting an iron bearing ore of the serpentine type having about 15 to 30% iron with an appreciable nickel content of about 1 to 2% under temperature conditions and for a time until both the metal and the slag are fluid, removing the slag, (2) pouring the molten metal into a ladle containing caustic soda, (3) reladling to secure complete mixing and remove the sulfur by the caustic soda treatment, (4) transferring the desulfurized metal to an acid-lined Bessemer-type converter and removing iron and carbon, (5) thereafter heating the alloy in an electric furnace and removing the phosphorous-bearing slag, (6) deoxidizing the metal, and (7) thereafter converting the alloy including added ferro-chrome in an electric furnace to a chrome-nickel stainless steel having an alloy content of about 18% chrome and 8% nickel and in which the nickel is substantially entirely that obtained from the original ore and the alloy is free of "tramp" alloys and constituents characteristic of remelted stainless steel scrap.

7. The process according to claim 1 wherein the ores treated are Cuban serpentine ores.

References Cited in the file of this patent

UNITED STATES PATENTS

| | | |
|---|---|---|
| 239,621 | Pirath | Apr. 5, 1881 |
| 934,247 | Walker | Sept. 14, 1909 |
| 1,665,146 | Reinartz et al. | Apr. 3, 1928 |
| 1,674,438 | Hybinette | June 19, 1928 |
| 1,939,874 | Brassert | Dec. 19, 1933 |
| 2,426,607 | Gronningsaeter | Sept. 2, 1947 |

OTHER REFERENCES

Evans: Metals and Alloys, July 1942, pages 80–81.

Liddell: Handbook of Nonferrous Metallurgy. Recovery of the Metals, 2nd edition, 1945, page 606, published by McGraw-Hill Book Co., Inc., New York, N. Y.